C. W. EBELING.
SOUND DEADENING UNIVERSAL CONNECTOR.
APPLICATION FILED AUG. 20, 1913. RENEWED JAN. 19, 1918.
1,261,794.
Patented Apr. 9, 1918.
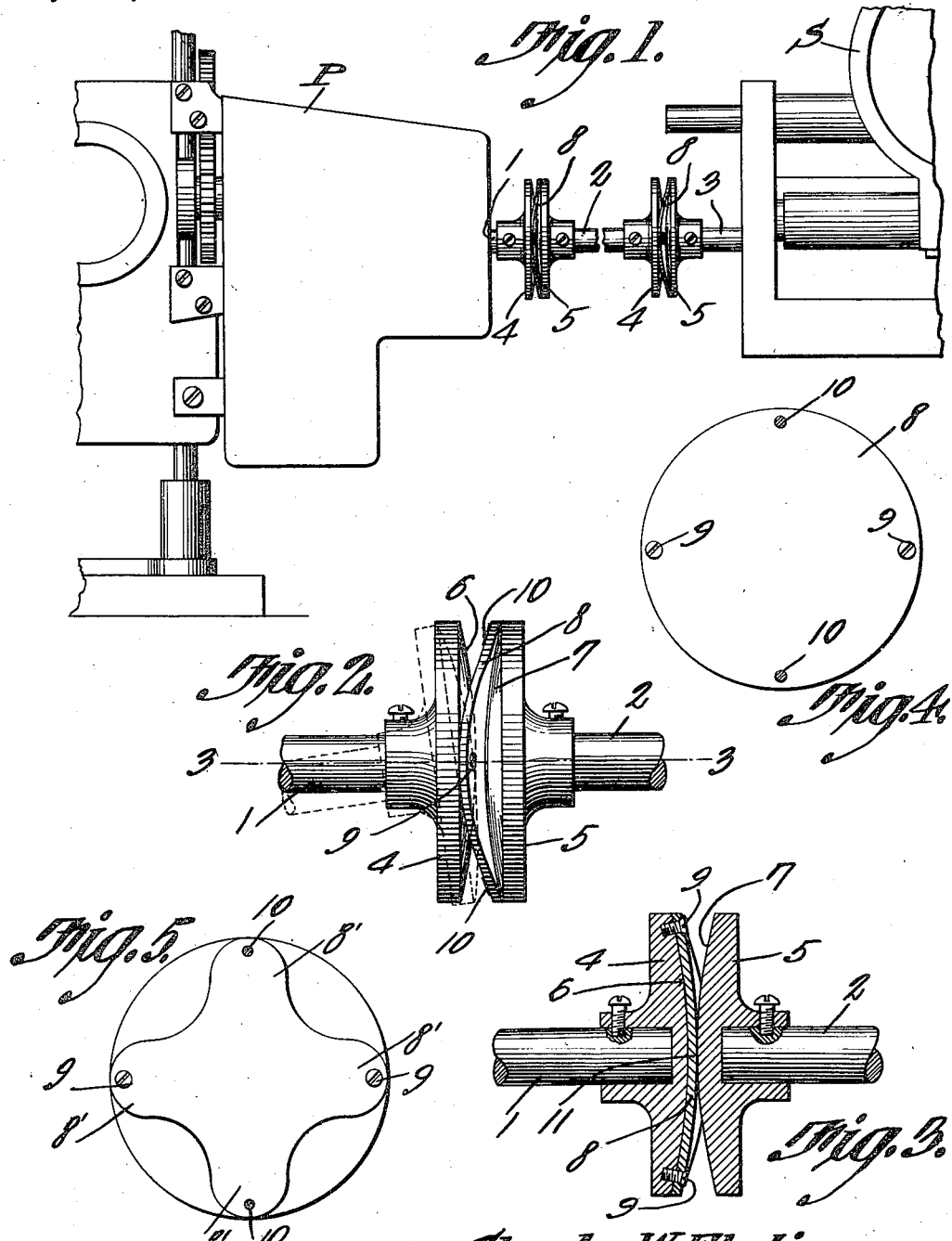

UNITED STATES PATENT OFFICE.

CHARLES W. EBELING, OF NEW YORK, N. Y.

SOUND-DEADENING UNIVERSAL CONNECTOR.

1,261,794.   Specification of Letters Patent.   Patented Apr. 9, 1918.

Application filed August 20, 1913, Serial No. 785,803. Renewed January 19, 1918. Serial No. 212,835.

*To all whom it may concern:*

Be it known that I, CHARLES W. EBELING, a citizen of the United States, residing at New York, in the county and State of New York, have invented new and useful Sound-Deadening Universal Connectors, of which the following is a specification.

The present invention relates to a universal connection or coupling adapted to be employed between the operating mechanism of a motion picture projector and a mechanism for rotating the record platform or mandrel of a sound reproducing machine, one object of the invention being the provision of a connection or coupling of this character, which will permit of the proper operation of the sound carrier from the motion picture projector whether the shaft connections between the two are in axial alinement or not, said coupling further providing a sound deadening means, whereby the sound due to the motor mechanism of the projector mechanism is eliminated from affecting the record platform and disk or cylinder so that the mechanical noise is not permitted to affect the stylus of the sound reproducing mechanism.

A further object of the present invention is the provision of a simple coupling of this character, which constitutes primarily, two disks, the adjacent faces of which are convexed, thereby constituting a joint which will permit of the proper disposition of the disks relative to each other and whereby the centers thereof will not have to be in axial alinement, there being interposed between the disks and connected thereto, a flexible connecting medium, made of a sound deadening material, as for instance leather, which will permit of the proper flexing of the connection and yet at the same time insure a positive rotation of the shaft operating the sound reproducing mechanism from the projector mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Figure 1 is a view in elevation of a portion of a projector mechanism and a portion of a sound reproducing device, showing two of the couplers connecting the two devices.

Fig. 2 is an enlarged detail view of one of the couplings, dotted lines illustrating an extreme flexing position permitted thereby.

Fig. 3 is a sectional view taken upon line 3—3 of Fig. 2.

Fig. 4 is a plan view of the flexible disk disposed between the concave faces of the main disks of the coupling.

Fig. 5 is a plan view of a modified form of flexible connector.

Referring to the drawings, the projector mechanism P, is to be taken indicative of any form of motion picture projector, while the sound reproducing device S is indicative of any form of sound reproducing machine that is not operated by a motor, in the present instance, a mandrel or cylinder machine being shown, and the projector device being the sole instrumentality by means of which the sound record carrier is operated.

It is desirable in this form of apparatus, that the mechanical noise due to the operation of the motor of the projector, be prevented from affecting the stylus of the sound reproducing mechanism and both mechanisms must be connected for synchronous operation. The shafts 1, 2 and 3, as clearly illustrated in Fig. 1, are connected by two couplings which consist primarily of the two shaft carried disks 4 and 5.

The adjacent faces of the metal disks 4 and 5 are convexed as at 6 and 7, and thus permit of the placing of the respective shafts 1 and 2, and 2 and 3 out of axial alinement, so that the centering of the two machines will not have to be too exact, and even should during the manipulation of the apparatus, due to wear or any other fault of the positioning of the same, the shafts be moved out of alinement, the proper transmission of power from the projector to the sound record carrier can be carried out.

In order to provide a means for properly connecting the disks 4 and 5 together, and at the same time act as a sound deadening or damping means therebetween, a disk 8, which is preferably made of leather, or of any other flexible material that will produce the necessary connection for simultaneous rotation between the disks 4 and 5, is employed. It may be said, however, that the member 8 may not of necessity be a disk, as it may be provided with four terminals 8', as clearly shown in Fig. 5.

In order to properly connect the flexible disk 8 to the coupling disks 4 and 5, screws or other fastenings 9 are disposed to connect the periphery of the disk at diametrically opposite points to the convex face 6 of the metal disk 4 while screws 10 are disposed at right angles to the screws 9 to connect the disk 8 at diametrically opposite points to the disk 5.

By this means it will be seen that the point of contact between the metal disks 4 and 5 will always have interposed therebetween as at 11 in Fig. 3, a portion of the flexible disk 8, and that as the connections 9 and 10 are quartering as relates to each other, the desirable flexibility is provided between the disks 4 and 5, so that the same may assume the various positions that are permitted in any form of universal joint.

What is claimed is:

1. A sound deadening universal joint coupling, comprising two disks, the faces of which are convexed, and a flexible connecting disk disposed between and connected alternately at four points, two points to each disk.

2. A sound deadening universal joint coupling, comprising two disks, the faces of which are convexed, and a flexible connecting disk between the two disks and connected alternately at four points, two to each disk, a portion of the flexible disk being abutted upon both sides by the first two disks to deaden the sound in the contact between the first two disks.

3. A sound deadening universal joint coupling, comprising two disks, the adjacent faces of which are convex, and a flexible connecting medium connected to the convex faces of both disks.

4. A sound deadening universal joint coupling, comprising two disks, the adjacent faces of which are convex, and a flexible connecting medium connected to the convex faces of both disks, such connection of the medium being at four points, two to each disk, so that the line joining the points of connection of the flexible connecting medium to one disk is at right angles to the line joining the points of connection of said medium to the other disk.

5. A universal coupling, including two disks having each a convex face, a sheet of flexible material connected at four points to the convex faces of both disks, there being a two point connection to each disk, and the connections to one disk being at right angles to the connections to the other disk.

In testimony that I claim the foregoing as my own, I have hereto affixed my signature in the presence of two witnesses.

CHAS. W. EBELING.

Witnesses:
  MAY MULLANE,
  FRED. J. WHELAN.